(12) United States Patent
Hoermandinger et al.

(10) Patent No.: US 9,724,990 B2
(45) Date of Patent: Aug. 8, 2017

(54) MOTOR VEHICLE HAVING A DRIVE TRAIN WITH A LATERALLY ARRANGED INTERNAL COMBUSTION ENGINE

(75) Inventors: Klaus Hoermandinger, Leonberg (DE); Nikolai Henger, Stuttgart (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 13/488,688

(22) Filed: Jun. 5, 2012

(65) Prior Publication Data

US 2012/0312622 A1    Dec. 13, 2012

(30) Foreign Application Priority Data

Jun. 9, 2011 (DE) .................. 10 2011 050 986

(51) Int. Cl.
| | |
|---|---|
| B60K 6/22 | (2007.10) |
| B60K 5/04 | (2006.01) |
| B60K 1/00 | (2006.01) |
| B60K 5/12 | (2006.01) |
| B60K 6/20 | (2007.10) |

(52) U.S. Cl.
CPC .................. B60K 5/04 (2013.01); B60K 1/00 (2013.01); B60K 5/12 (2013.01); B60K 5/1216 (2013.01); B60K 6/20 (2013.01); B60Y 2200/92 (2013.01)

(58) Field of Classification Search
USPC ...... 180/65.21, 65.22, 65.245, 291–293, 297
See application file for complete search history.

(56) References Cited

U.S. PATENT DOCUMENTS

| | | | |
|---|---|---|---|
| 3,211,249 A | 10/1965 | Papst | |
| 5,513,719 A | 5/1996 | Moroto et al. | |
| 5,967,251 A | 10/1999 | Turl et al. | |
| 6,073,713 A * | 6/2000 | Brandenburg et al. .... | 180/65.22 |

(Continued)

FOREIGN PATENT DOCUMENTS

| | | |
|---|---|---|
| AT | 245 947 | 3/1966 |
| DE | 44 31 929 | 10/1995 |

(Continued)

OTHER PUBLICATIONS

2007 Toyota Camry hybrid Parts diagram—retrieved from www.toyotaoempartsworld.com on Nov. 16, 2015.*

(Continued)

*Primary Examiner* — J. Allen Shriver, II
*Assistant Examiner* — Travis Coolman
(74) *Attorney, Agent, or Firm* — Gerald E. Hespos; Michael J. Porco; Matthew T. Hespos

(57) ABSTRACT

A motor vehicle (10) has a drive train in the region of a front axle. A body of the motor vehicle has connection points (1, 2, 3) for a laterally arranged internal combustion engine, a vehicle transmission (15) and a torque plate of a motor vehicle (10) that can be driven exclusively by the internal combustion engine. The connection points (1, 2, 3) also are connection points for a hybrid drive train (11). The vehicle uses a modular design principle and can be equipped with differently designed drive systems, including conventional drive exclusively by an internal combustion engine and hybrid drive, without having to make structural modifications. The hybrid drive train may be a serial hybrid or a parallel hybrid.

11 Claims, 6 Drawing Sheets

(56) References Cited

U.S. PATENT DOCUMENTS

| | | | |
|---|---|---|---|
| 6,557,656 B2* | 5/2003 | Haniu et al. | 180/65.6 |
| 7,562,737 B2* | 7/2009 | Miyahara et al. | 180/291 |
| 7,578,363 B2 | 8/2009 | Kim | |
| 8,042,793 B2* | 10/2011 | Igami | 267/292 |
| 8,417,427 B2 | 4/2013 | Stridsberg | |
| 2009/0166122 A1* | 7/2009 | Luo et al. | 180/297 |
| 2009/0314559 A1* | 12/2009 | Palitto | 180/65.22 |
| 2010/0025127 A1* | 2/2010 | Oyobe | 180/65.22 |
| 2011/0036659 A1 | 2/2011 | Erjawetz et al. | |
| 2011/0109180 A1* | 5/2011 | Akutsu et al. | 310/77 |
| 2011/0312460 A1 | 12/2011 | Nett et al. | |
| 2012/0267185 A1* | 10/2012 | Hirai | B60G 7/02 180/291 |
| 2012/0305327 A1* | 12/2012 | Lambri et al. | 180/291 |
| 2013/0018540 A1* | 1/2013 | Yamazaki | 701/22 |

FOREIGN PATENT DOCUMENTS

| | | |
|---|---|---|
| DE | 196 28 181 | 1/1998 |
| DE | 10 2010 027 592 | 2/2011 |
| JP | 8-310252 | 11/1996 |
| JP | 2000-289651 | 10/2000 |
| JP | 2002-316541 | 10/2002 |
| JP | 2006-205816 | 8/2006 |
| JP | 2009-61914 | 3/2009 |
| JP | 2010-852 | 1/2010 |
| KR | 20040042595 | 5/2004 |
| WO | 2010/063735 | 6/2010 |

OTHER PUBLICATIONS

2007 Toyota Camry LE 2.4 liter engine Parts diagram—retrieved from www.toyotaoempartsworld.com on Nov. 16, 2015.*

* cited by examiner

MOTOR VEHICLE HAVING A DRIVE TRAIN WITH A LATERALLY ARRANGED INTERNAL COMBUSTION ENGINE

CROSS REFERENCE TO RELATED APPLICATION

This application claims priority under 35 USC 119 to German Patent Appl. No. 10 2011 050 986.0 filed on Jun. 9, 2011, the entire disclosure of which is incorporated herein by reference.

BACKGROUND OF THE INVENTION

1. Field of the Invention

The invention relates to a motor vehicle having a drive train in the region of a front vehicle axle, having connection points of the drive train in a body of the motor vehicle for a laterally arranged internal combustion engine, a vehicle transmission and a torque plate of a motor vehicle that can be driven exclusively by the internal combustion engine.

2. Description of the Related Art

Motor vehicles with a laterally arranged internal combustion engine have been known for a long time and typically are used for front-wheel drive vehicles. The laterally arranged internal combustion engine disposed at a front part of the vehicle drives the left and right front wheels of the motor vehicle. The internal combustion engine is coupled mechanically and torque-coupled to the vehicle transmission. The transmission has a spur gear stage with two cardan shafts arranged in front of or behind the internal combustion engine relative to the direction of travel of the vehicle and are connected to the transmission, for driving the wheels of the vehicle axle.

This classical connection of the drive train comprising the internal combustion engine and the vehicle transmission has a first connection point between the internal combustion engine and the vehicle body, a second connection point between the transmission and the vehicle body and a third connection point between the drive train and the vehicle body. This third connection point has the function of a torque plate. The first and second connection points support the weight of the components of the drive train.

The connection points for the internal combustion engine and the transmission are two longitudinal members, and the connection point for the torque plate is a crossmember of the motor vehicle.

Hybrid drives for motor vehicles have been developed increasingly developed in recent years. The hybrid drive has a relatively small internal combustion engine and an electric traction motor. The hybrid drive trains may be serial hybrid drive trains or parallel hybrid drive trains.

The object of the invention is to develop a motor vehicle that can be equipped with differently designed drive systems in the manner of a modular design principle without making structural modifications.

SUMMARY OF THE INVENTION

The invention relates to a motor vehicle where connection points for a drive train that can be driven exclusively by the internal combustion engine are the same as those used for the connection of a hybrid drive train.

Irrespective of the design of the hybrid drive train, no connection points are provided for the hybrid drive train other than the connection points needed in a drive train for a motor vehicle that can be driven exclusively by the internal combustion engine, therefore, a classical drive train without a hybrid part. These existing connection points have been used in the hybrid drive train.

The hybrid may be a serial hybrid with an internal combustion engine, a generator, an electric traction motor and a transmission that are coupled mechanically. However, first the internal combustion engine and the generator, and second the electric motor and the transmission are torque-coupled. The serial hybrid has a very compact drive train in which the internal combustion engine drives the generator for generating power and the generated power is delivered to the electrical traction machine. The electrical traction machine drives the wheels via the transmission. The internal combustion engine is small because the drive power of the vehicle is provided by the electric traction motor and the internal combustion engine merely drives the generator. The vehicle also usually has a battery that can supply power to the electric motor.

The hybrid also may be a parallel hybrid with an internal combustion engine, an electric traction motor and a transmission mechanical coupling these components and torque coupling these components. The internal combustion engine and the electric motor of the parallel hybrid jointly act on the input shaft of the transmission. Therefore, the forces of the torques of the internal combustion engine and the electric motor can be provided at the same time at least in an operating state. This allows less stringent design of the electric motor and the internal combustion engine. The internal combustion engine can be smaller than in a vehicle driven exclusively by the internal combustion engine.

All three types of motor vehicles, namely those driven exclusively by combustion power, serial hybrids and parallel hybrids, include a transmission with a spur gear stage having two cardan shafts arranged in front of or behind the internal combustion engine relative to the direction of travel of the vehicle and connected to the transmission for driving an axle, in particular the front axle of the vehicle. Therefore, the classical manner of transmitting force between the transmission and drive shafts is maintained while maintaining the connection points for the drive train in these three concepts.

The same connection points for the three different concepts are selected so that the internal combustion engine is mounted in one longitudinal member of the vehicle, the vehicle transmission is mounted in the other longitudinal member of the vehicle, and the torque plate is mounted in a crossmember that connects the two longitudinal members.

The invention therefore permits the formation of a drive train in a motor vehicle in a modular design system, in particular in a motor vehicle with front-wheel drive. Either a classical front/lateral arrangement of an internal combustion engine is provided for driving the right and left wheel, in particular the right and left front wheel, or, as an alternative, a serial or parallel hybrid version is provided. All three versions use the same three connection points in the vehicle body. These connection points are the classical connection points for the internal combustion engine, the vehicle transmission and the torque plate of a classical lateral arrangement, and particularly a classical front/lateral arrangement of the internal combustion engine.

BRIEF DESCRIPTION OF THE DRAWINGS

FIG. 1 is a schematic front view of a motor vehicle in the region of a drive train associated with a front axle with a serial hybrid drive train.

FIG. 2 is a schematic top elevational view of a motor vehicle with the serial hybrid drive train shown in FIG. 1.

DETAILED DESCRIPTION OF THE PREFERRED EMBODIMENT

Figure 1:
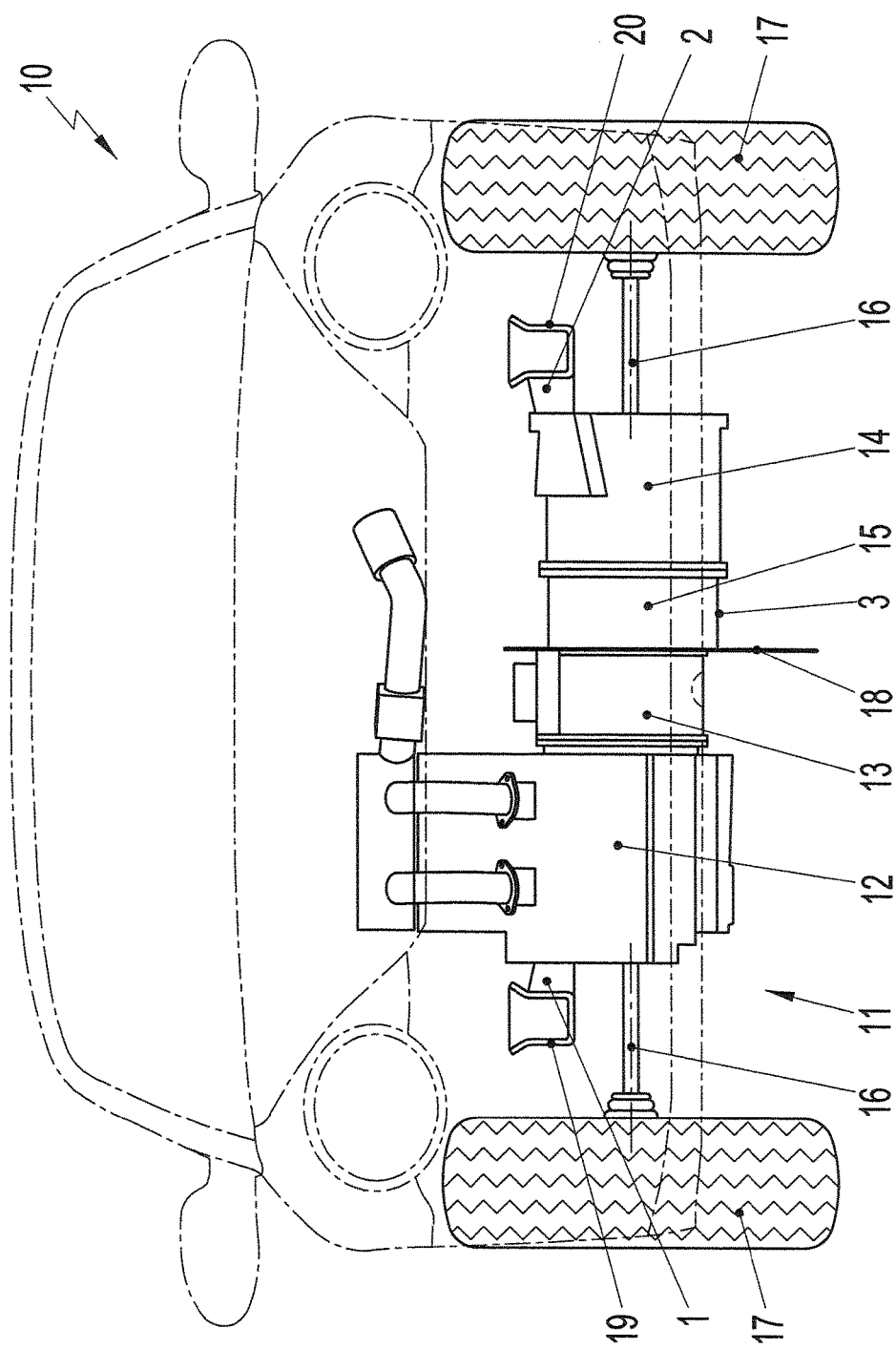
Figure 2:
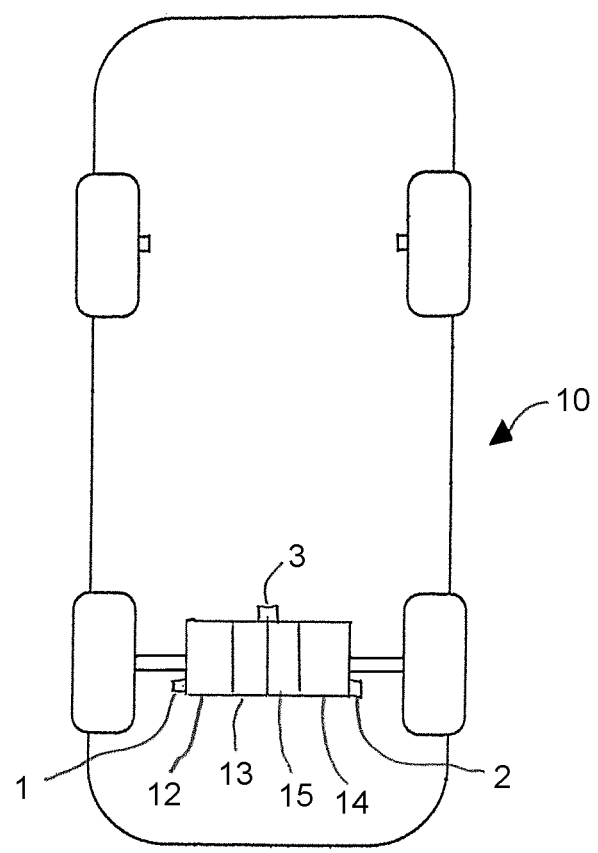

FIGS. 1 and 2 show the serial hybrid version for the drive concept of a front-axle drive of a motor vehicle 10.

The drive train 11 of the serial hybrid has a small internal combustion engine 12, a generator 13, an electric traction motor 14 and a transmission 15. The box formed by the dashed line illustrates the drive train 11 in the region of the front assembly of the motor vehicle 10. The transmission 15 is a spur gear stage having two cardan shafts 16 arranged behind the internal combustion engine 12 relative to the direction of travel of the motor vehicle 10. However, the cardan shafts 16 could be in front of the internal combustion engine 12. The cardan shafts 16 are connected to the transmission 15, for driving the wheels 17 of the front axle of the motor vehicle 10.

The internal combustion engine 12, the generator 13, the electric motor 14 and the transmission 15 are coupled mechanically and therefore connected to one another to form a unit. Specifically, the internal combustion engine 12 is connected to one end of the generator 13 and the transmission 15 is connected to the other end of the generator. The electric motor 14 is connected to the end of transmission 15 averted from the generator. In this serial hybrid, first the internal combustion engine 12 and the generator 13 are torque-coupled, and second the electric motor 14 and the transmission 15 are torque-coupled. To illustrate this situation, the line 18 is shown between the generator 13 and the transmission 15 in FIG. 1. The internal combustion engine 12 drives the generator 13 to generate power. The generated power is delivered to the electric motor 14 and the electric motor 14 drives the left and the right wheels 17 via the transmission 15.

The mechanical unit comprising the internal combustion engine 12, the generator 13, the electric motor 14 and the transmission 15 forms the drive train 11, is mounted at the connection points 1, 2 and 3 of the body of the motor vehicle 10, as shown in FIGS. 1 and 2. The connection point 1 is the connection between the drive train 11 in the region of the internal combustion engine 12 and the longitudinal member of the vehicle body on the right side relative to the forward direction of travel, while the drive train 11 in the region of the electric motor 14 is connected to the left side longitudinal member 20 in the region of the connection point 2. The drive train 11 is supported at the connection point 3 by a crossmember (not illustrated in any more detail) that connects the two longitudinal members 19 and 20. The connection point 3 is between the two longitudinal members 19 and 20. Since the crossmember is not visible in the illustration of FIG. 1, the connection point 3 is illustrated relative to the lateral extent of the vehicle, but is situated behind the transmission 15. FIG. 2, however, schematically illustrates the connection point 3 between the transmission 15 and the crossmember.

The connection points 1 and 2 function to support the weight of the drive train 11, while the connection point 3 functions to receive the torque introduced into the vehicle body via the drive train 11 and therefore serves as the torque plate.

The internal combustion engine 12, which is a small internal combustion engine on account of the function of a so-called range extender, and the electric motor 14 are torque-decoupled, the drive train 11 can be formed so that an offset is possible between the crankshaft of the internal combustion engine 12 and the output shaft of the electric motor 14. Thus, the drive train 11 can have a lower center of gravity and permits a variable package overall.

Figure 3:
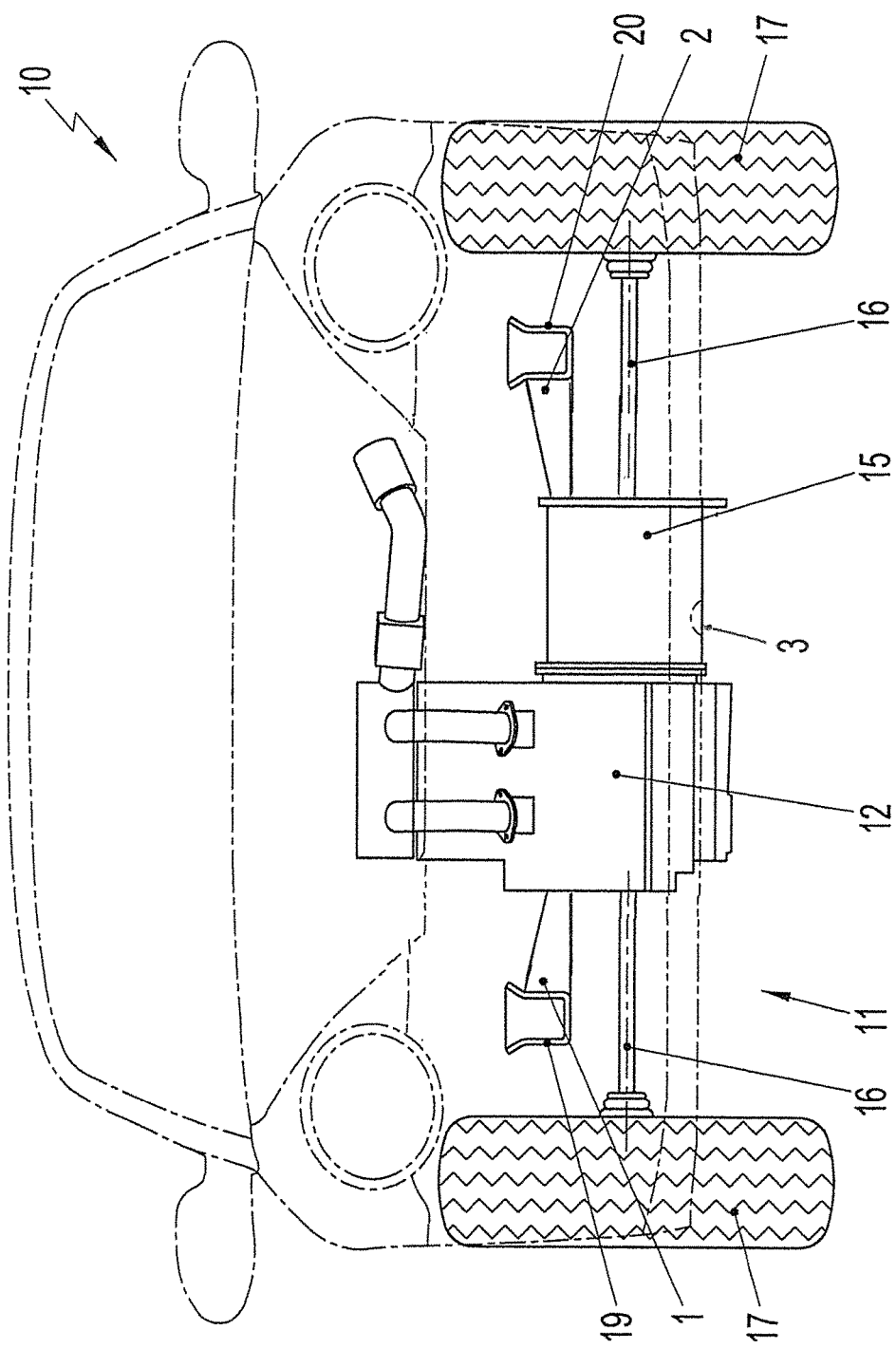
FIG. 3 is a schematic front view of a motor vehicle similar to FIG. 1, but showing a conventional drive train.
Figure 4:
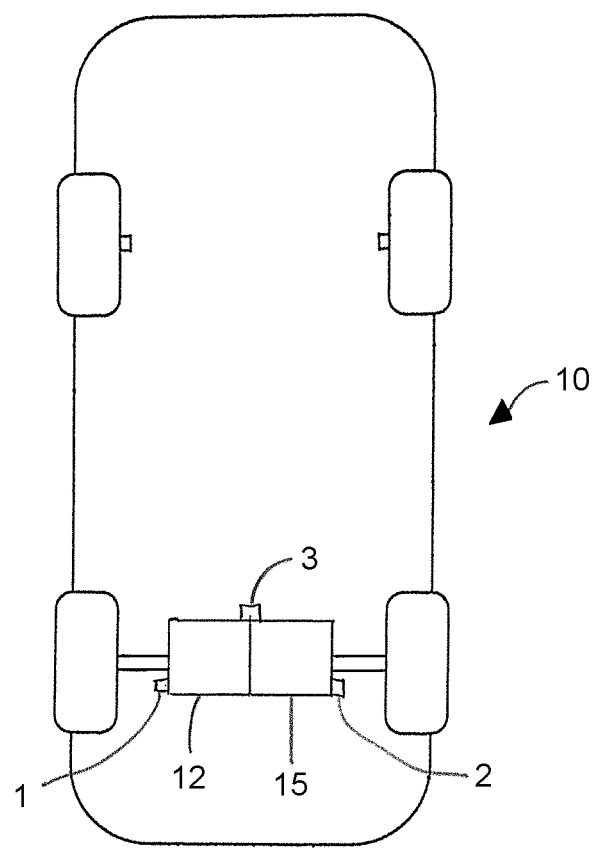
FIG. 4 is a schematic top elevational view of a motor vehicle with the conventional drive train shown in FIG. 3.

The connection points 1, 2 and 3 for supporting the drive train 11 of the described serial hybrid correspond to those of a conventional vehicle that is driven exclusively by an internal combustion engine 12 and that has a drive train formed by the internal combustion engine 12 and the transmission 15. The conventional drive train is illustrated schematically in FIGS. 3 and 4.

Figure 5:
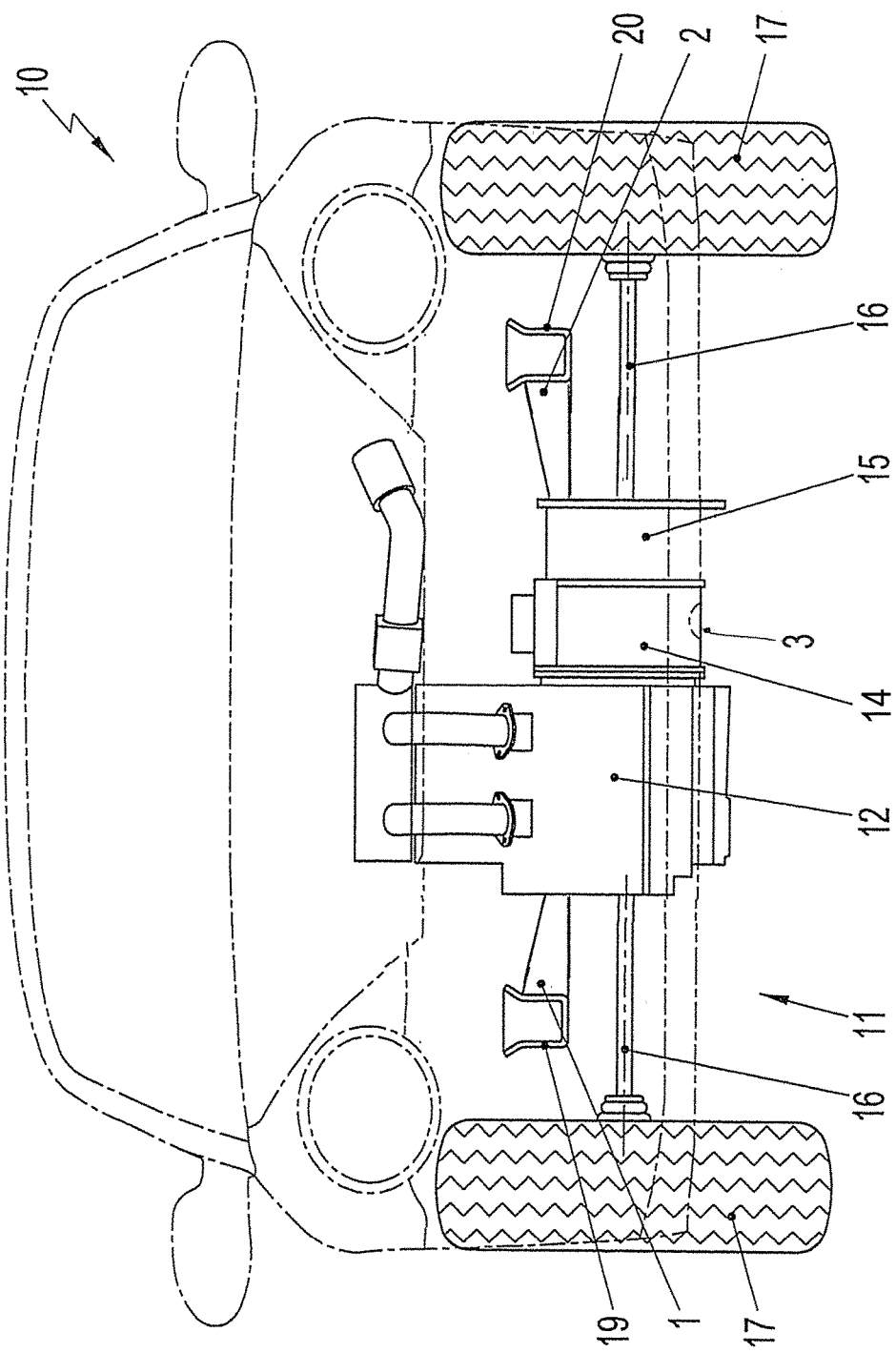
FIG. 5 is a schematic front view of a motor vehicle similar to FIG. 1, but showing a parallel hybrid drive train.
Figure 6:
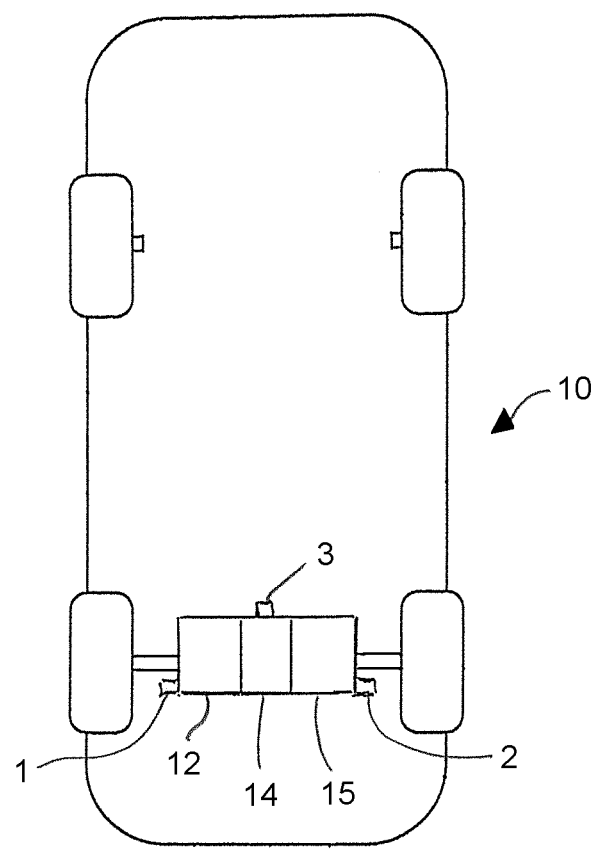
FIG. 6 is a schematic top elevational view of a motor vehicle with the parallel hybrid drive train shown in FIG. 1.

As an alternative to the conventional vehicle and serial hybrid, a drive train for a parallel hybrid also can be supported readily without any change to the connection points 1, 2 and 3, as shown in FIGS. 5 and 6. The parallel hybrid has an internal combustion engine 12, an electric traction motor 14 and a transmission 15, with these components being mechanically coupled and torque-coupled. The generator can be dispensed with in principle. However, the electric motor 14 preferably is in the form of an electrical machine. The electrical machine 14 can operate both in motor mode to act as a traction motor and in generator mode to generate electrical energy and to supply said electrical energy to a battery. The battery functions to supply power to the electrical machine in motor mode.

All three of the described versions—conventional vehicle which is driven exclusively by means of the internal combustion engine, serial hybrid, and parallel hybrid—use the same connection points 1, 2 and 3 in the vehicle body.

What is claimed is:

1. A motor vehicle comprising: a body with first, second and third connection points disposed at fixed specified positions in proximity to an axle of the vehicle and configured for selectively supporting one of:

a conventional drive train having an internal combustion engine as an exclusive drive power source for the motor vehicle and a transmission arranged laterally of the internal combustion engine, the conventional drive train having no traction motor, the internal combustion engine of the conventional drive train being supported at the first connection point of the vehicle, the transmission of the conventional drive train being supported at the second connection point of the vehicle and the third connection point of the vehicle being connected to a location on the conventional drive train to receive torque introduced from the conventional drive train to the vehicle; and a hybrid drive train in a region of the vehicle axle, the hybrid drive train having a laterally arranged internal combustion engine that is smaller than the internal combustion engine of the conventional drive train and that is supported at the first connection point, the hybrid drive train further having an electric traction motor supported at the second connection point, and a vehicle transmission for the hybrid drive train supported at the third connection point, whereby the first, second and third connection points at the fixed specified positions of the vehicle enable the body of the vehicle to support either the conventional drive train or the hybrid drive train.

2. The motor vehicle of claim 1, wherein the vehicle body has first and second longitudinal members and a crossmember between the longitudinal members, the first and second connection points being provided respectively on the first and second longitudinal members and the third connection point being on the crossmember.

3. The motor vehicle of claim 2, wherein the connection points and the hybrid drive train are in proximity to a front end of the motor vehicle.

4. The motor vehicle of claim 3, wherein the transmission of the hybrid drive train has a spur gear stage with two cardan shafts arranged behind the internal combustion engine relative to a direction of travel of the motor vehicle and are connected to the transmission, for driving wheels of a front vehicle axle of the vehicle.

5. The motor vehicle of claim 2, wherein the third connection point is a torque plate that receives torque introduced into the body by the hybrid drive train.

6. The motor vehicle of claim 1, wherein the hybrid drive train has a serial hybrid.

7. The motor vehicle of claim 6, wherein the serial hybrid has the laterally arranged internal combustion engine, a generator, the electric traction motor and the transmission mechanically coupled to one another, the internal combustion engine and the generator defining a torque coupled first subassembly and the traction motor and the transmission defining a torque coupled second subassembly, with torque decoupling between the first subassembly of the internal combustion engine and the generator with respect to the second subassembly of the electric motor and the transmission.

8. The motor vehicle of claim 1, wherein the transmission of the hybrid drive train has a spur gear stage with two cardan shafts arranged in front of or behind the internal combustion engine relative to a direction of travel of the motor vehicle and are connected to the transmission of the hybrid drive train, for driving the wheels of a vehicle axle of the vehicle.

9. A motor vehicle, comprising: a body with first, second and third connection points disposed at fixed specified positions in proximity to an axle of the vehicle and configured for selectively supporting one of:

a conventional drive train having an internal combustion engine as an exclusive drive power source for the motor vehicle and a transmission arranged laterally of the internal combustion engine, the conventional drive train having no traction motor, the internal combustion engine of the conventional drive train being supported at the first connection point of the vehicle, the transmission of the conventional drive train being supported at the second connection point of the vehicle and the third connection point of the vehicle being connected to a location on the conventional drive train to receive torque introduced from the conventional drive train to the vehicle; and a hybrid drive train in a region of the vehicle axle, the hybrid drive train having a laterally arranged internal combustion engine that is smaller than the internal combustion engine of the conventional drive train and that is supported at the first connection point, the hybrid drive train further having an electric traction motor supported at the second connection point, and a vehicle transmission for the hybrid drive train supported at the third connection point, wherein the hybrid drive train has a parallel hybrid, whereby the first, second and third connection points at the fixed specified positions of the vehicle enable the body of the vehicle to support either the conventional drive train or the hybrid drive train.

10. The motor vehicle of claim 9, wherein the parallel hybrid has an internal combustion engine, an electric traction motor and a transmission, with mechanical coupling and torque coupling of the internal combustion engine, the electric traction motor and the transmission.

11. The motor vehicle of claim 10, wherein the parallel hybrid has an electrical machine that can be operated as the electric traction motor and as a generator.

* * * * *